(12) United States Patent
Yokosawa

(10) Patent No.: US 7,412,725 B2
(45) Date of Patent: Aug. 12, 2008

(54) COPYRIGHT PROTECTION SYSTEM, DIGITAL INFORMATION PROCESSING APPARATUS AND COPYRIGHT PROTECTION METHOD

(75) Inventor: Teruhisa Yokosawa, Nagano (JP)

(73) Assignee: Fuji Electric Device Technology Co., Ltd., Tokyo (JP)

( * ) Notice: Subject to any disclaimer, the term of this patent is extended or adjusted under 35 U.S.C. 154(b) by 780 days.

(21) Appl. No.: 10/354,145

(22) Filed: Jan. 30, 2003

(65) Prior Publication Data

US 2003/0156716 A1    Aug. 21, 2003

(30) Foreign Application Priority Data

Feb. 4, 2002    (JP) .............................. 2002-027408

(51) Int. Cl.
*G06F 17/30*    (2006.01)
(52) U.S. Cl. ...................................................... 726/26
(58) Field of Classification Search ............... 726/26
See application file for complete search history.

(56) References Cited

U.S. PATENT DOCUMENTS

| 6,983,050 | B1 * | 1/2006 | Yacobi et al. ............... 380/210 |
| 2002/0138439 | A1 * | 9/2002 | Matsushima et al. .......... 705/52 |
| 2003/0078853 | A1 * | 4/2003 | Peinado et al. ................ 705/26 |

FOREIGN PATENT DOCUMENTS

| JP | 10-13784 | 1/1998 |
| JP | 2000-113586 | 4/2000 |

OTHER PUBLICATIONS

"Basic of encryption theory (Angouriron No Kiso)", published by Kyouritu Shuppan Kabushiki Kaisha, Nov. 1, 1996, p. 14-19.

* cited by examiner

*Primary Examiner*—Gilberto Barron, Jr.
*Assistant Examiner*—Kristin D Sandoval
(74) *Attorney, Agent, or Firm*—Manabu Kanesaka

(57) ABSTRACT

A copyright protection system includes a digital information processing apparatus for processing digital information of a work and a copyright managing server for managing the copyright of the digital information. The digital information processing apparatus includes an encrypted information receiving device for receiving the digital information encrypted using the first encrypting function; an encrypting device for encrypting the digital information using the second encrypting function; and a decrypting information transmitting device for transmitting decrypting information to the digital information processing apparatus. The copyright managing server includes decrypting a function transmitting device for transmitting a decrypting function to decrypt the encrypted information encrypted by the first encrypting function and the second encrypting function in response to the information transmitted by the decrypting information transmitting device.

11 Claims, 4 Drawing Sheets

COPYRIGHT PROTECTION SYSTEM, DIGITAL INFORMATION PROCESSING APPARATUS AND COPYRIGHT PROTECTION METHOD

BACKGROUND OF THE INVENTION AND RELATED ART STATEMENT

The present invention relates to a copyright protection system, a digital information processing apparatus, and a copyright protection method. More specifically, the present invention relates to a copyright protection system, a digital information processing apparatus, and a copyright protection method, wherein when digital AV information of a work is read from or written to a recording medium, the corresponding copyright is protected.

In conventional computer-readable recording media, it is required to precisely copy digital information. Regardless of how many times the digital information is repeatedly copied or whether the digital information is copied to different recording media, the identical digital information is recorded or reproduced. However, for the digital information concerning works such as digital AV (Audio-Visual) information, copying such digital AV information infringes the copyright of the information. To prevent such infringement of the copyright, scrambling codes are embedded in recording media such as DVDs. Accordingly, the information can not be copied without removing the code, thereby protecting the copyright.

However, it is still possible to disable the protection function using a readily available program or the like created by a hacker. Accordingly, the copyrights are not completely protected. Thus, it is required to provide a digital recording system incorporating a copyright protection system different from the current recording system used in computers so far.

Further, in digital broadcasting or the like, all receivers receive the same electric waves, thereby making it difficult to carry out different types of encryption for the respective receivers. Normally, a single type of encryption is carried out for all the receivers. Consequently, once digital AV information is decrypted, it is easy to copy and use the information illegally.

Furthermore, a conventional encrypting technique is intended to protect personal information against others. However, for protecting the copyright, the copyright information is required to be protected only against those who attempt to copy the digital AV information illegally.

The present invention is provided in view of these problems. An object of the present invention is to provide a copyright protection system, a digital information processing apparatus, and a copyright protection method for creating an environment where it is possible to copy required information legitimately while preventing illegal copying, so that the digital information can be freely and safely used while protecting the corresponding copyright.

Further objects and advantages of the invention will be apparent from the following description of the invention.

SUMMARY OF THE INVENTION

To attain the above object, in the first aspect of the present invention, a copyright protection system includes a digital information processing apparatus for processing digital information of a work, and a copyright managing server for managing the copyright of the digital information. The digital information processing apparatus includes encrypted information receiving means for receiving the digital information encrypted by using the first encrypting function; encrypting means for encrypting the digital information received by the encrypted information receiving means using the second encrypting function; and decrypting information transmitting means for transmitting decrypting information to the digital information processing apparatus to decrypt the encrypted information encrypted by the second encrypting function. The copyright managing server includes decrypting function transmitting means for transmitting a decrypting function to decrypt the encrypted information encrypted by the first encrypting function and the second encrypting function in response to the information transmitted by the decrypting information transmitting means.

According to the second aspect of the present invention, in the copyright protection system in the first aspect, the first encrypting function and the second encrypting function use the same function system.

According to the third aspect of the present invention, in the copyright protection system according to the second aspect, a solution of the function system is a remainder obtained by multiplying the digital information by a matrix and dividing each element of the product by a predetermined prime number.

According to the fourth aspect of the present invention, in the copyright protection system according to the first aspect, when the first encrypting function is defined as $\rho$, the second encrypting function is defined as $\sigma$, and the function for decrypting the encrypting based on the first encrypting function and second encrypting function is defined as $\tau$, an equation $\rho*\sigma*\tau=1$ is established.

According to the fifth aspect of the present invention, in the copyright protection system according to the first aspect, when the first encrypting function is defined as $\rho$, the second encrypting function is defined as $\sigma$, and the function for decrypting the encryption based on the first encrypting function and second encrypting function is defined as $\tau$, an equation $\tau=\sigma^{-1}*\rho^{-1}$ is established.

According to the sixth aspect of the present invention, in the copyright protection system according to the first aspect, the digital information processing apparatus further comprises re-encrypting means for further encrypting the digital information encrypted by the encrypting means using the third encrypting function, and means for recording the digital information encrypted by the third encrypting function on a recording medium.

According to the seventh aspect of the present invention, in the copyright protection system according to the sixth aspect, the third encrypting function is specific to the recording medium.

According to the eighth aspect of the present invention, a digital information processing apparatus includes encrypted information receiving means for receiving the digital information encrypted by the first encrypting function, and encrypting means for encrypting the digital information received by the encrypted information receiving means using the second encrypting function.

According to the ninth aspect of the present invention, the copyright protection apparatus according to the eighth aspect further comprises encrypted information transmitting means for transmitting information for decrypting the encryption based on the second encrypting function to a copyright managing server that manages the copyright of the digital information, and means for receiving a decrypting function for decrypting the encryption based on the first encrypting function and the second encrypting function from the copyright managing server in response to the transmission of the information by the encrypted information transmitting means.

According to the tenth aspect of the present invention, in the copyright protection apparatus according to the ninth aspect, the first encrypting function and the second encrypting function use the same function system.

According to the eleventh aspect of the present invention, in the copyright protection apparatus according to the tenth aspect, a solution of the function system is a remainder obtained by multiplying the digital information by a matrix and dividing each element of the product by a predetermined prime number.

According to the twelfth aspect of the present invention, in the copyright protection apparatus according to the ninth aspect, when the first encrypting function is defined as $\rho$, the second encrypting function is defined as $\sigma$, and the function for decrypting the encryption based on the first encrypting function and second encrypting function is defined as $\tau$, an equation $\rho*\sigma*\tau=1$ is established.

According to the thirteenth aspect of the present invention, in the copyright protection apparatus according to the ninth aspect, when the first encrypting function is defined as $\rho$, the second encrypting function is defined as $\sigma$, and the function for decrypting the encryption based on the first encrypting function and second encrypting function is defined as $\tau$, an equation $\tau=\sigma^{-1}*\rho^{-1}$ is established.

According to the fourteenth aspect of the present invention, the copyright protection apparatus according to the ninth aspect further comprises second encrypting means for encrypting the digital information encrypted by the first encrypting means using the third encrypting function, and means for recording the digital information encrypted by the third encrypting function on a recording medium.

According to the fifteenth aspect of the present invention, in the copyright protection apparatus according to the fourteenth aspect, the third encrypting function is specific to the recording medium.

The sixteenth aspect of the present invention provides a copyright protection method in a copyright protection system comprising a digital information processing apparatus for processing digital information of a work, and a copyright managing server for managing the copyright of the digital information. In the copyright protection method, the digital information processing apparatus receives the digital information encrypted by the first encrypting function, encrypts the received digital information using the second encrypting function, and transmits information for decrypting the encrypting based on the second encrypting function to the copyright managing server. In response to the transmitted information, the copyright managing server transmits a decrypting function for decrypting the encryption based on the first encrypting function and the second encrypting function.

According to the seventeenth aspect of the present invention, a copyright protection method uses a copyright protection apparatus for protecting digital information of a work. In the copyright protection method the digital information encrypted by the first encrypting function is received, and the received digital information is encrypted by using the second encrypting function.

According to the present invention, specific encrypting functions are provided in both the digital AV information of a work transmitted by a person or corporation having a corresponding copyright (hereinafter referred to as a "copyright owner or the like") and a recording medium on which the digital AV information is recorded. Then, the server that manages the copyright of the digital AV information is provided with the decrypting function or a key for decrypting the encryption based on the encrypting function specific to the digital AV information. On the other hand, the recording medium is provided with the decrypting function or a key for decrypting the encryption based on an encrypting function specific to the recording medium. Accordingly, it is possible to protect the copyright safely.

That is, it is impossible to obtain the digital AV information simply by recording the information on the recording medium. It is necessary to obtain both the decrypting function specific to the digital AV information and the specific decrypting function written on the recording medium in order to read and reproduce the digital AV information correctly.

In a case that the decrypting function is specific only to the digital AV information, when someone can decrypt the corresponding encryption, it is possible for other people to obtain the digital AV information. Similarly, in a case that the decrypting function is specific only to the recording medium, it is possible to obtain the digital AV information when the recording medium is analyzed to decrypt the information.

With the present system, it is possible to decrypt only when the decrypting functions specific to both the digital AV information and the recording medium are provided, thereby protecting the copyright more securely. In this case, the encrypting and decrypting functions are specific to the recording medium so that each recording medium has a different decrypting function. Accordingly, different recording media have different encrypting and decrypting functions.

When each recording medium has different encrypting and decrypting functions, even if digital data from a recording medium is copied to another recording medium, it is impossible to decrypt because each recording medium uses a different decrypting function. That is, when the digital AV information (data) is copied on a recording medium, the encrypting and decrypting functions compatible with the recording medium must be generated. When the encrypting and decrypting functions are generated, a system can request a fee for the copyright as needed, thereby eliminating illegal copying.

A person has an intention when copying. Thus, since a user pays a fee for the copyright in order to obtain the digital AV information, this copyright protection system is reasonable as compared to the conventional technique that permits unlimited copying once a user purchases the digital AV information. Also, with this system, it is possible to offer a wide range of fees.

Further, according to the present invention, each recording medium on which the information is recorded has different encrypting and decrypting functions specific to the recording medium. Thus, even if the same digital AV information is transferred as in the digital broadcasting or the like, the information is recorded on different recording media as different data, thereby improving security in terms of copyright protection.

Furthermore, when the data is copied, the information contains a number specific to the recording medium to which the data is copied or the digital AV information corresponding to the data is encrypted, thereby preventing illegal copying.

When the data is copied as the digital AV information compatible with a recording medium, the data must be converted into data that can be decrypted. Thus, a conversion mechanism is provided in a managing server or the like controlled by a copyright owner or the like. With this configuration, a terminal is connected to the managing server via a digital line or the like so that the managing server can calculate the decrypting function (and the encrypting function as needed).

It is possible to protect the copyright through the system where a fee of the copyright is charged as necessary when the calculation process is performed. Furthermore, the fee can be set according to various demands depending on cases in which a user wants to see the digital AV information, or to copy the information.

DETAILED DESCRIPTION OF PREFERRED EMBODIMENTS

Figure 1:
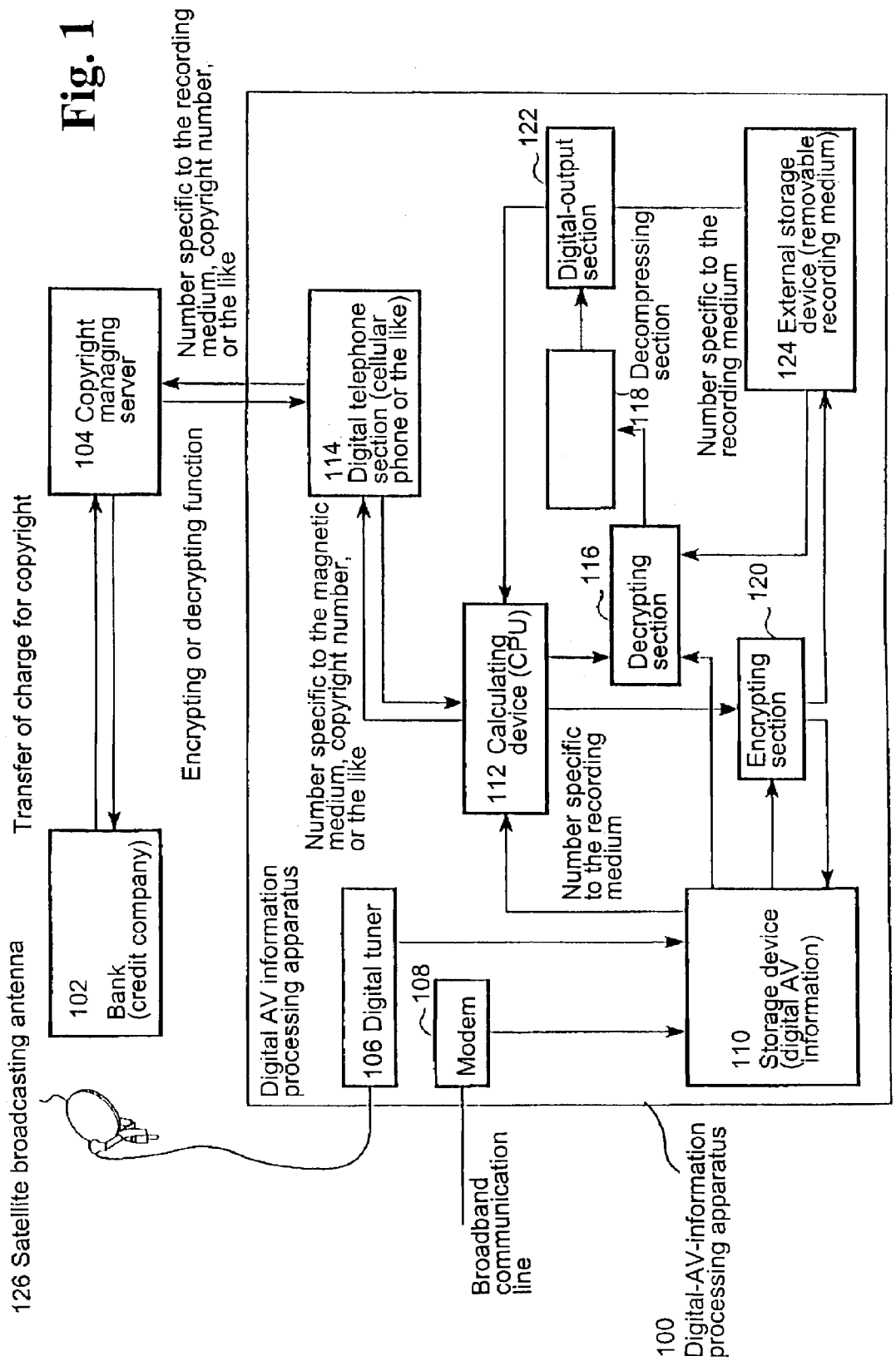
FIG. 1 is a block diagram showing a configuration of a digital AV information processing apparatus according to an embodiment of the present invention.

First, functions for encrypting and decrypting used in a copyright protection system according to an embodiment will be described.

Reference characters $\rho$, $\sigma$, and $\phi$ denote an encrypting matrix (n×n) for encrypting. The encrypting function uses a function system as an operation rule of the encrypting matrix in which a solution is a remainder obtained by multiplying the matrix and dividing each of the elements by a large prime number N. In the following description, an operator of this operation rule is represented as "·"

$$\rho \cdot \sigma = \rho * \sigma \bmod N \quad (1)$$

An operation rule $\sigma \cdot \sigma^{-1}$ for the inverse matrix is similarly defined by:

$$\sigma \cdot \sigma^{-1} = \sigma * \sigma^{-1} \bmod N = E \quad (2)$$

A reference character C1 denotes encrypted digital AV information defined by:

$$C1 = \rho(M) = \rho * M \bmod N \quad (3)$$

where M is non-encrypted digital AV information.

A reference character C2 denotes encrypted digital AV information specific to a recording medium, and is defined by:

$$C2 = \sigma(C1) = \sigma * C1 \bmod N \quad (4)$$

C2 and M satisfy the following equation:

$$M = \tau(C2) = \tau * C2 \bmod N \quad (5)$$

where a reference character $\tau$ denotes a decrypting matrix defined by:

$$\tau = \rho^{-1} * \sigma^{-1} \bmod N \quad (6)$$

A reference character C3 denotes encrypted digital AV information specific to a recording medium, and is defined by:

$$C3 = \phi(C2) = \phi * C2 \bmod N \quad (7)$$

C3 and M satisfy the following equation:

$$M = \psi(C3) = \psi * C3 \bmod N \quad (8)$$

where a reference character $\psi$ denotes a decrypting matrix defined by:

$$\psi = \rho^{-1} * \sigma^{-1} * \phi^{-1} \bmod N \quad (9)$$

Hereunder, embodiments of the invention will be described with reference to the accompanying drawings.

FIG. 1 is a block diagram showing a configuration of a digital AV information processing apparatus 100 according to the embodiment. The digital AV information processing apparatus 100 comprises a satellite broadcasting antenna 126 and a digital tuner 106 for receiving digital broadcasting, and a modem 108 for retrieving information from a broad band. The digital AV information processing apparatus 100 further has a storage device (recording medium) 110 for temporarily storing the information, a decompressing section 118 for converting digital AV information into actual images, and a digital output section 122 for outputting video and audio to a television or the like. This configuration is the same as that of a common digital information processing apparatus.

In this embodiment, in addition to the above common components, the digital AV information processing apparatus 100 further comprises an encrypting section 120 and a decrypting section 116 for handling encrypted data; an external recording device (removable recording medium) 124 for storing temporary information stored in the storage device 110 as user data; a digital telephone section 114 for requesting an external authentication for copyright protection according to the information received; and a calculation device 112 for controlling the components in the digital AV information processing apparatus 100. The digital telephone section 114 is used to communicate with a copyright managing server 104 that manages the copyright of the digital AV information. The digital telephone section 114 may consist of a cellular phone or the like.

A copyright administrator manages a copyright using the copyright managing server 104, and transfers fee for the copyright to a bank (or credit company) 102 account of the copyright owner or the like based on the information related to duplication of a work received from the digital-AV information processing apparatus 100.

Figure 2:
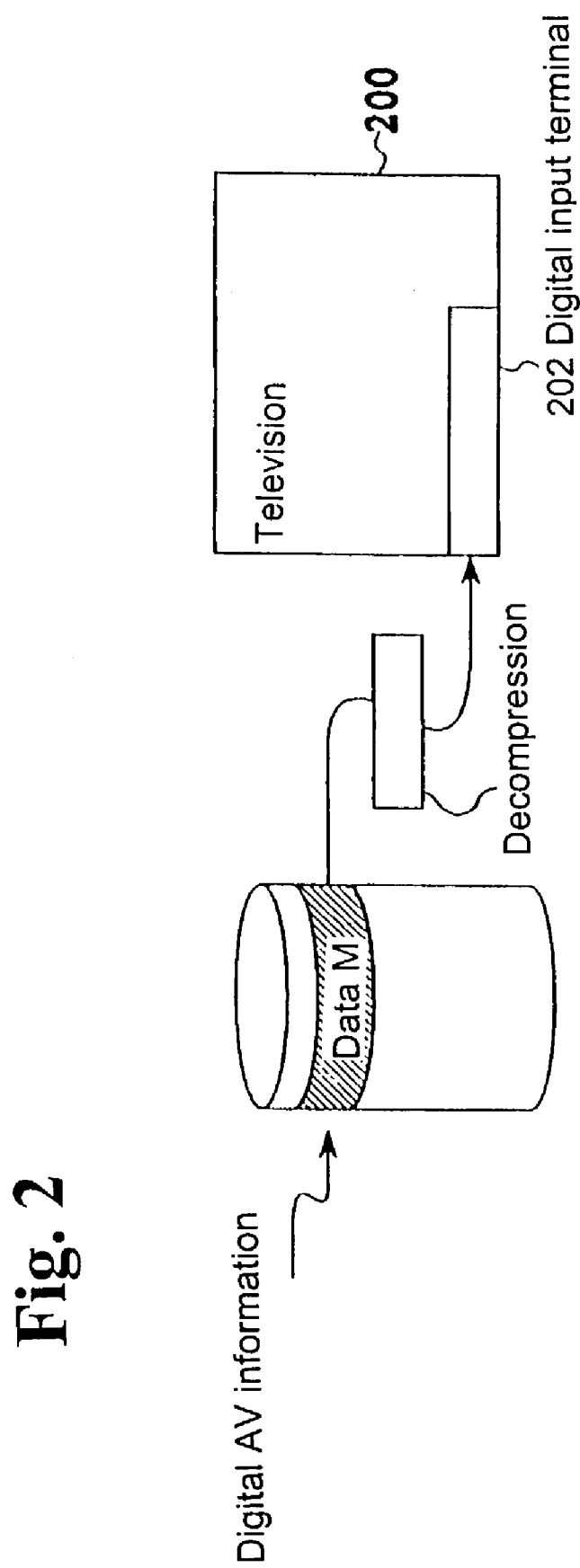
FIG. 2 is a view showing a method of displaying non-encrypted digital AV information.

FIG. 2 shows a process of displaying non-encrypted digital AV information. The digital AV information obtained through the digital broadcasting or the broad band is normally compressed. Thus, the digital AV information can be output directly to a digital input terminal 202 of a television 200 simply by decompression.

Figure 3:
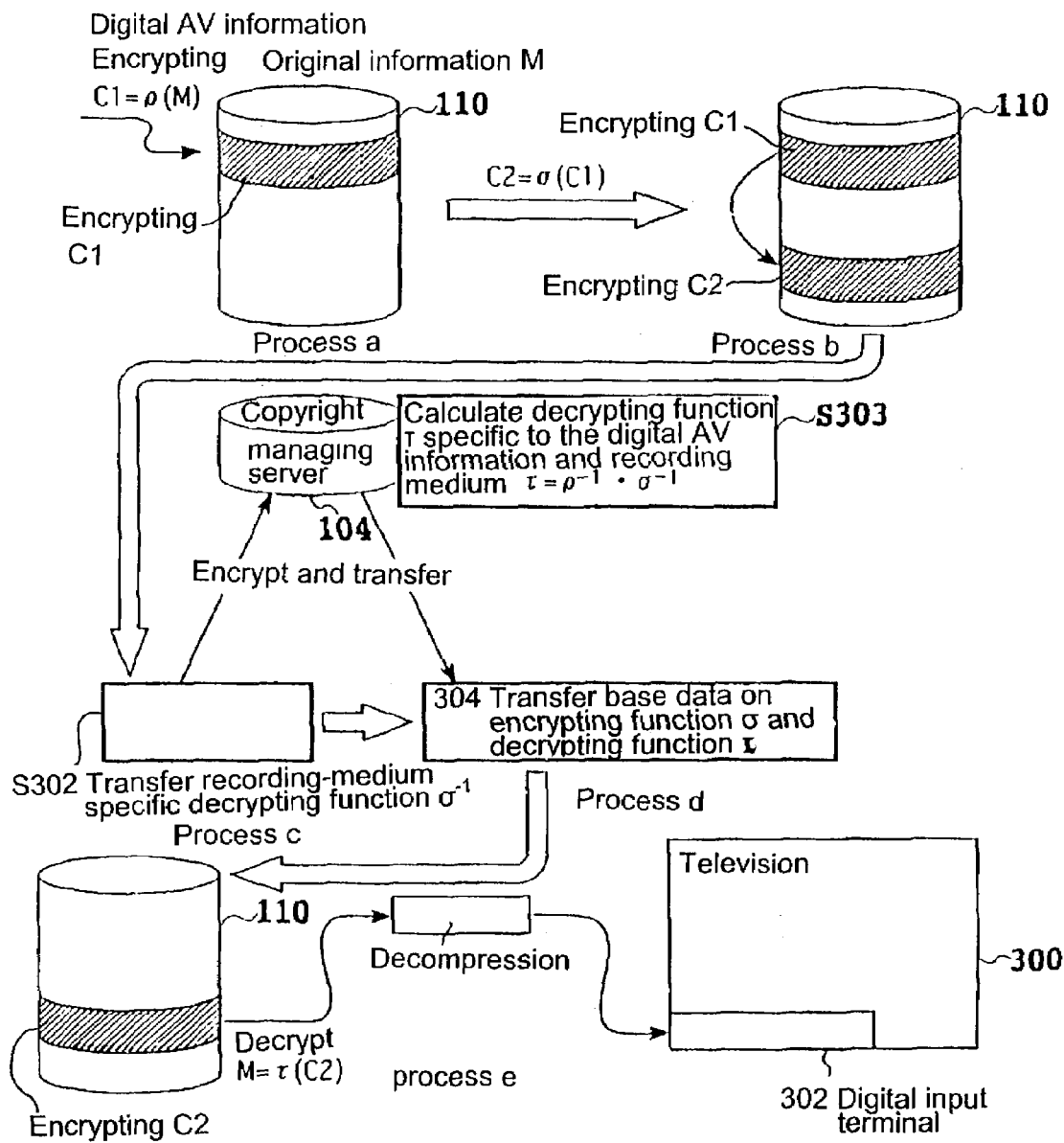
FIG. 3 is a flowchart showing a process of a copyright protection method according to an embodiment of the present invention.

Now, with reference to a flowchart shown in FIG. 3, a process of displaying the digital AV information in the digital-AV information processing apparatus according to the embodiment will be described.

The digital AV information A is encrypted by the encrypting function $\rho$ at a side where the data is transmitted, and is transmitted as digital AV information C1. In this case, it is necessary to transmit at the least both a header indicating that the information is encrypted and corresponding information with which the user can contact before decrypting i.e., a way of accessing the copyright managing server 104, such as a telephone number. In a process a in FIG. 3, the digital AV information processing apparatus 100 records the encrypted AV information C1 in the storage device 110 in real time.

Then, as shown in a process b, the encrypting function $\sigma$ specific to a recording medium is used to convert the digital AV information C1, i.e. the received data, into encrypted data C2 again. That data is then recorded. Once the encrypted digital AV information C2 is obtained, the digital AV information C1 is unnecessary and may thus be deleted. Further, when an encrypting calculation speed is faster than an input speed of the digital AV information, a decrypting process can be executed immediately without recording the digital AV information C1. The digital AV information C2 may then be recorded.

The digital AV information C2 can be displayed after decrypted in a process c and the following steps. First, as shown in the process c, the encrypting or decrypting function $\sigma^{-1}$ specific to the storage device 110 is transferred to the copyright managing server 104 via the digital telephone section 114 (S302). At this time, another encrypting means may be used to transfer information for decrypting the encrypting of the encrypting function σ so that the encrypting function or decrypting function $\sigma^{-1}$ specific to the recording medium will not be disclosed, thereby further enhancing the copyright protection. A system for charging a fee when connected to the copyright managing server 104 via the digital telephone section 114 may be combined, so that the fee is collected when the digital AV information is displayed.

The copyright managing server 104 uses the encrypting function σ or decrypting function $\sigma^{-1}$ specific to the recording medium and the encrypting function ρ or decrypting function $\rho^{-1}$ managed by the copyright managing server 104 to calculate the decrypting function τ for decrypting the encryptions specific to both the digital AV information and the recording medium (S303). In an example shown in FIG. 3, the decrypting function τ is calculated by $\rho^{-1} \cdot \sigma^{-}$.

Then, as shown in a process d, the calculated decrypting function τ specific to the digital AV information and the recording medium is transferred to the digital AV information processing apparatus 100 via the digital telephone section 114 (S304). Also in this case, a different encrypting process may be applied to the transferred decrypting function τ to enhance the copyright protection. In the processes c and d, the communication with the copyright managing server 104 via the digital telephone section 114 is completed.

As described above, the digital AV information processing apparatus 100 receives the digital information encrypted by the encrypting function ρ, uses the encrypting function σ to encrypt the digital information, and transmits the information σ or $\sigma^{-1}$ for decrypting the encrypting based on the encrypting function σ. In response to the transmitted information, the copyright managing server 104 transmits the decrypting function τ for decrypting the encrypting based on the encrypting functions ρ and σ. Therefore, it is possible to copy the required information legally, while inhibiting illegal copying.

Lastly, to display the data, as shown in a process e, the decrypting function τ determined in the process d is used to decrypt the digital AV information C2. Thus, the encrypted and recorded information is decrypted into the original digital AV information M. Then, the decompressing section 118 performs decompression to reproduce the contents of the digital AV information to output the information to the digital input terminal 302 of a television 300, as in the case of the conventional non-encrypted digital AV information.

The above-described processes will be described by using the encrypting function ρ and decrypting function $\rho^{-1}$ specific to specific digital AV information, as well as the encrypting function σ and decrypting function $\sigma^{-1}$ specific to the recording medium. In the following description, $N=257=2^8+1$ is used as a common prime number for the entire encrypting process. Further, for the purpose of simplification, 2×2 matrix is used to perform calculations. However, when a value of N and a size of the matrix become larger, it takes longer time to calculate, in particular, for an inverse matrix, thereby providing a system more immune to hacking.

First, the original digital AV information:

$$M = \begin{bmatrix} 56 \\ 92 \end{bmatrix} \quad \text{(Equation 1)}$$

and the encrypting function ρ specific to the digital AV information are provided. Then, the encrypting process specific to the digital AV information is executed.

$$\rho = \begin{bmatrix} 38, & 129 \\ 215, & 93 \end{bmatrix} \quad \text{(Equation 2)}$$

As restrictions on the matrix ρ, it is necessary that the determinant is not zero ($|\rho| \neq 0$) and a value for each element in the matrix is smaller than N. Each element may have an arbitrary value, provided that these restrictions are met. Further, when the value of N and the size of the matrix become larger, an almost infinite number of the encrypting functions can exist (for an n×n matrix, there are approximately $N^{(n \times n)}$ encrypting functions). Thus, even if the numbers of the digital AV information and the recording media become large, the encrypting functions specific to each of the digital AV information and the recording medium can be easily provided.

A calculation process of encrypting is defined by:

$$\rho(M) = \rho * M \bmod N$$

Then, the digital AV information C1 is obtained as follows:

$$C1 = \rho * M \bmod N = \begin{bmatrix} 39, & 187 \\ 215, & 93 \end{bmatrix} * \begin{bmatrix} 56 \\ 92 \end{bmatrix} = \begin{bmatrix} 113 \\ 36 \end{bmatrix} \quad \text{(Equation 3)}$$

Then, the digital AV information C1 encrypted by this calculation process is distributed.

Next, the encrypting function σ specific to the recording medium is used to execute an encrypting process again. As in the case of the encrypting, $$\sigma(C1) = \sigma * C1 \bmod N$$

is used for a calculation process of encrypting.

$$\sigma = \begin{bmatrix} 38, & 129 \\ 223, & 194 \end{bmatrix} \quad \text{(Equation 4)}$$

$$C2 = \rho * C1 \bmod N = \begin{bmatrix} 38, & 129 \\ 223, & 194 \end{bmatrix} * \begin{bmatrix} 113 \\ 36 \end{bmatrix} = \begin{bmatrix} 200 \\ 58 \end{bmatrix}$$

With this process, it is possible to encrypt based on the encrypting functions specific to the digital AV information and the recording medium. Further, the encrypted information can be recorded.

Then, to calculate the decrypting function τ for decrypting, the digital telephone section 114 is used to transmit the decrypting function $\sigma^{-1}$, i.e. the inverse matrix of the encrypting function specific to the recording medium, to the copyright managing server 104. In this case, the decrypting function $\sigma^{-1}$ specific to the recording medium can be determined by the calculation shown below. An operation rule of the determinant used in this case is, similar to that for the calculation process of encrypting, that the solution is the remainder obtained by dividing the value of each element obtained through multiplication by N.

$$\sigma \cdot \sigma^{-1} = \sigma * \sigma^{-1} \bmod N = E \quad \text{(Equation 5)}$$

(· denotes an operation rule, and * denotes multiplication.)

In which, $$\sigma = \begin{bmatrix} a, b \\ c, d \end{bmatrix} \sigma^{-1} = \begin{bmatrix} e, f \\ g, h \end{bmatrix}$$

$$\sigma \cdot \sigma^{-1} = \begin{bmatrix} ae + bg \bmod N, af + bh \bmod N \\ ce + dg \bmod N, cf + dh \bmod N \end{bmatrix} = \begin{bmatrix} 1, 0 \\ 0, 1 \end{bmatrix}$$

The matrix $\sigma^{-1}$ can be determined by sequentially calculating the values e, f, g, and h that satisfy this equation.

$$\sigma^{-1} = \begin{bmatrix} 5, 255 \\ 136, 152 \end{bmatrix} \quad \text{(Equation 6)}$$

The matrix $\sigma^{-1}$ is then transferred to the copyright managing server 104.

In the copyright managing server 104, the decrypting function $\rho^{-1}$, the inverse function of the encrypting function $\rho$ specific to the digital AV information, and the transferred decrypting function $\sigma^{-1}$ are used to calculate the encrypting function $\tau$ specific to the recording medium ($=\rho^{-1} \cdot \sigma^{-1} = \rho^{-1} * \sigma^{-1} \bmod N$), by the following equation:

$$\rho^{-1} = \begin{bmatrix} 210, 42 \\ 128, 229 \end{bmatrix} \quad \text{(Equation 7)}$$

$$\tau = \rho^{-1} * \sigma^{-1} \bmod N = \begin{bmatrix} 80, 53 \\ 173, 114 \end{bmatrix}$$

The copyright managing server 104 transfers the obtained decrypting function $\tau$ to the digital AV information processing apparatus 100. The digital AV information processing apparatus 100 stores the decrypting function $\tau$ in a recording device (e.g., the storage device 110 or the like).

To reproduce the recorded digital AV information, the digital AV information processing apparatus 100 uses the decrypting function $\tau$ to carry out decrypting.

$$M = \tau(C2) = \tau * C2 \bmod N \quad \text{(Equation 8)}$$

$$M = \begin{bmatrix} 80, 53 \\ 173, 114 \end{bmatrix} * \begin{bmatrix} 200 \\ 58 \end{bmatrix} \bmod 257 = \begin{bmatrix} 56 \\ 92 \end{bmatrix}$$

In this manner, the encrypted digital AV information is converted back into the original information M. After that, the digital AV information can be reproduced simply through the decompression.

Next, with reference to a flow chart shown in FIG. 4, the second embodiment of the present invention in which the digital AV information is saved on an external recording device will be described. In this embodiment, the digital AV information is copied to a removable recording medium 124, and the information is reproduced.

Figure 4:
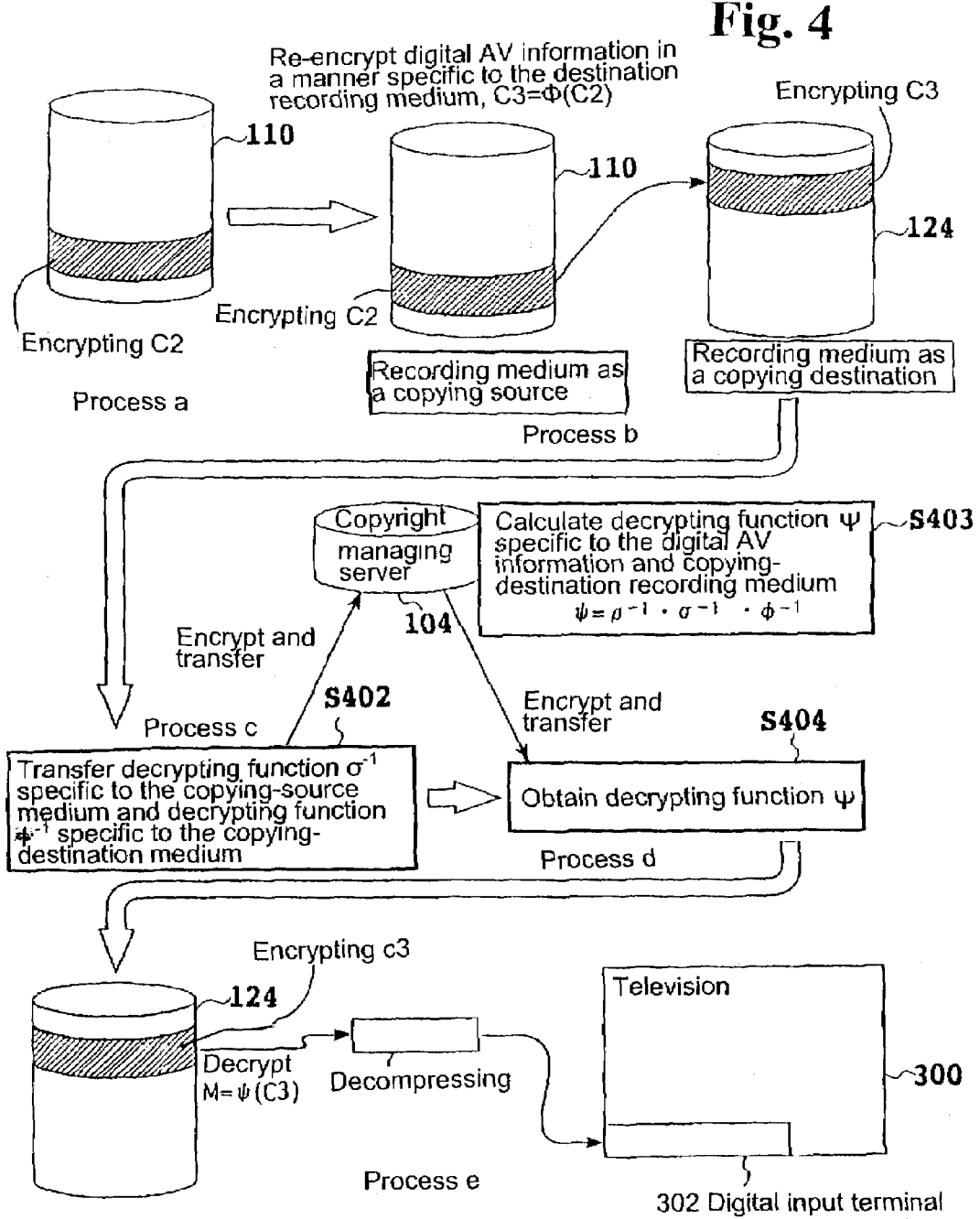
FIG. 4 is a flowchart showing a process for a copyright protection method according to an embodiment of the present invention.

As shown in a process a in FIG. 4, the data to be copied is the encrypted digital AV information C2 on the storage device 110, as described above. In a process b, the encrypted digital AV information C2 to be copied is encrypted again using an encrypting function $\phi$ specific to a recording medium to which the information is to be copied. The re-encrypted digital AV information C2 is stored in the external recording device 124.

$$C3 = \phi(C2) = \phi * C2 \bmod N \quad \text{(Equation 9)}$$

$$\phi = \begin{bmatrix} 214, 84 \\ 6, 244 \end{bmatrix} \phi^{-1} = \begin{bmatrix} 182, 148 \\ 84, 88 \end{bmatrix}$$

$$C3 = \begin{bmatrix} 214, 84 \\ 6, 244 \end{bmatrix} * \begin{bmatrix} 200 \\ 58 \end{bmatrix} \bmod 257 = \begin{bmatrix} 127 \\ 189 \end{bmatrix}$$

In a process c, the digital telephone section 114 is used to transmit the encrypting function $\sigma$ or decrypting function $\sigma^{-1}$ specific to the recording medium (storage device 110) used as a copying source, and the encrypting function $\phi$ or decrypting function $\phi^{-1}$ specific to the recording medium (external recording device 124) used as a copying destination, to the digital AV information processing apparatus 100 (S402). At this time, the two types of encrypting or decrypting functions specific to the recording media are transferred. Therefore, reproduction of the copied digital AV information can be distinguished from ordinary reproduction of the digital AV information. Thus, different fees can be charged for reproduction and for copying.

The copyright managing server 104 uses the already possessed decrypting function $\rho^{-1}$ and the transferred decrypting functions $\sigma^{-1}$ and $\phi^{-1}$ to calculate a decrypting function $\psi$ specific to the recording media. In this case, when the transferred functions are encrypting functions, the decrypting functions $\sigma^{-1}$ and $\phi^{-1}$ specific to the recording media can be determined by calculating the inverse matrixes.

$$\psi = \rho^{-1} \cdot \sigma^{-1} \cdot \phi^{-1} = \rho^{-1} * \sigma^{-1} * \phi^{-1} \bmod N \quad \text{(Equation 10)}$$

$$\psi = \begin{bmatrix} 210, 42 \\ 128, 229 \end{bmatrix} * \begin{bmatrix} 5, 255 \\ 136, 152 \end{bmatrix} * \begin{bmatrix} 182, 148 \\ 84, 88 \end{bmatrix} \bmod N = \begin{bmatrix} 251, 56 \\ 199, 170 \end{bmatrix}$$

The calculated decrypting function $\psi$ specific to the digital AV information and the recording medium used as the copying destination are transmitted to the digital AV information processing apparatus 100 through the digital telephone section 114.

In a process d, the decrypting function $\psi$ transmitted by the copyright managing server 104 is stored in the recording device (e.g., the storage device 110 or the like) (S404).

To display the encrypted digital AV information C3 on the removable recording medium 124, the transferred decrypting function ψ is used to decrypt the digital AV information C3 as shown in a process e.

$$M = \psi(C3) = \psi * C3 \bmod N \quad \text{(Equation 11)}$$

$$M = \begin{bmatrix} 251, & 56 \\ 199, & 170 \end{bmatrix} * \begin{bmatrix} 127 \\ 189 \end{bmatrix} \bmod 257 = \begin{bmatrix} 56 \\ 92 \end{bmatrix}$$

Thus, the encrypted and recorded information is converted into the original digital AV information M. After that, the contents of the digital AV information can be reproduced by the decompressing operation performed by the decompressing section 118.

As described above, in this embodiment, the encrypting and decrypting functions specific to each recording medium are provided, as are the encrypting and decrypting functions specific to digital AV information. At least two or three of these encrypting functions are used to execute an encrypting process and recording. Accordingly, the digital AV information is encrypted by using a different encrypting function for each of the digital information and the recording medium. It is necessary to obtain at least two or three decrypting functions, including those for the recording medium and the digital AV information, before the information can be decrypted.

As described above, the present invention provides the copyright protection system that makes it possible to legally copy the information, while inhibiting the illegal use.

Further, the different processes are executed for cases in which the digital information can be simply reproduced and the information is copied, thereby enabling a wide range of fee structure.

While the invention has been explained with reference to the specific embodiments of the invention, the explanation is illustrative and the invention is limited only by the appended claims.

What is claimed is:

1. A copyright protection system, comprising:
   first encrypting means for encrypting digital information of a work with a first encrypting function, said first encrypting function being specific to the digital information,
   a digital information processing apparatus including encrypted information receiving means for receiving the digital information encrypted by the first encrypting function, second encrypting means for encrypting the digital information received by the encrypted information receiving means with a second encrypting function, said second encrypting function being specific to a medium recording the digital information, and decrypting information transmitting means for transmitting decrypting information for decrypting the digital information encrypted by the second encrypting function, and
   a copyright managing server for managing a copyright of the digital information including a receiving device for receiving the decrypting information transmitted from the decrypting information transmitting means, and decrypting function transmitting means for transmitting a decrypting function for decrypting the digital information encrypted by the first encrypting function and the second encrypting function in response to the decrypting information transmitted by the decrypting information transmitting means,
   wherein said first encrypting function and said second encrypting function use a same function system, said function system having a solution that is a remainder obtained by multiplying the digital information by a matrix to obtain a product and dividing each element of the product by a predetermined prime number.

2. A copyright protection system, comprising:
   first encrypting means for encrypting digital information of a work with a first encrypting function, said first encrypting function being specific to the digital information,
   a digital information processing apparatus including encrypted information receiving means for receiving the digital information encrypted by the first encrypting function, second encrypting means for encrypting the digital information received by the encrypted information receiving means with a second encrypting function, said second encrypting function being specific to a medium recording the digital information, and decrypting information transmitting means for transmitting decrypting information for decrypting the digital information encrypted by the second encrypting function, and
   a copyright managing server for managing a copyright of the digital information including a receiving device for receiving the decrypting information transmitted from the decrypting information transmitting means, and decrypting function transmitting means for transmitting a decrypting function for decrypting the digital information encrypted by the first encrypting function and the second encrypting function in response to the decrypting information transmitted by the decrypting information transmitting means,
   wherein in case said first encrypting function is defined as ρ, said second encrypting function is defined as σ, and said decrypting function for decrypting the digital information encrypted by the first encrypting function and second encrypting function is defined as τ, an equation ρ*σ*τ=1 is established.

3. A copyright protection system according to claim 1, wherein in case said first encrypting function is defined as ρ said second encrypting function is defined as σ, and said decrypting function for decrypting the digital information encrypted by the first encrypting function and second encrypting function is defined as τ, an equation $\tau = \sigma^{-1} * \rho^{-1}$ is established.

4. A copyright protection system according to claim 1, wherein said digital information processing apparatus further includes re-encrypting means for further encrypting the digital information encrypted by the second encrypting means with a third encrypting function, and recording means for recording the digital information encrypted by the third encrypting function on a recording medium.

5. A copyright protection system according to claim 4, wherein said third encrypting function is specific to the recording medium.

6. A copyright protection apparatus, comprising:
   first encrypting means for encrypting digital information of a work with a first encrypting function, said first encrypting function being specific to the digital information,
   encrypted information receiving means for receiving digital information encrypted by the first encrypting function,
   second encrypting means for encrypting the digital information received by the encrypted information receiving means with a second encrypting function, said second encrypting function being specific to a medium recording the digital information, a copyright managing server that manages a copyright of the digital information, encrypted information transmitting means for transmitting decrypting information to decrypt the digital information encrypted by the second encrypting function to the copyright managing server, and receiving means for receiving a decrypting function that decrypts the digital information encrypted by the first encrypting function and second encrypting function from the copyright managing server in response to the decrypting information transmitted from the encrypted information transmitting means, wherein said first encrypting function and said second encrypting function use a same function system, said function system having a solution that is a remainder obtained by multiplying the digital information by a matrix to obtain a product and dividing each element of the product by a predetermined prime number.

7. A copyright protection apparatus, comprising:

first encrypting means for encrypting digital information of a work with a first encrypting function, said first encrypting function being specific to the digital information, encrypted information receiving means for receiving digital information encrypted by the first encrypting function, second encrypting means for encrypting the digital information received by the encrypted information receiving means with a second encrypting function, said second encrypting function being specific to a medium recording the digital information, a copyright managing server that manages a copyright of the digital information, encrypted information transmitting means for transmitting decrypting information to decrypt the digital information encrypted by the second encrypting function to the copyright managing server, and receiving means for receiving a decrypting function that decrypts the digital information encrypted by the first encrypting function and second encrypting function from the copyright managing server in response to the decrypting information transmitted from the encrypted information transmitting means, wherein in case said first encrypting function is defined as $\rho$, said second encrypting function is defined as $\sigma$, and said decrypting function for decrypting the digital information encrypted by the first encrypting function and second encrypting function is defined as $\tau$, an equation $\rho*\sigma*\tau=1$ is established.

8. A copyright protection apparatus according to claim 6, wherein in case said first encrypting function is defined as $\rho$, said second encrypting function is defined as $\sigma$, and said decrypting function for decrypting the digital information encrypted by the first encrypting function and second encrypting function is defined as $\tau$, an equation $\tau=\sigma^{-1}*\rho^{-1}$ is established.

9. A copyright protection apparatus according to claim 6, further comprises third encrypting means for further encrypting the digital information encrypted by the second encrypting means with a third encrypting function, and recording means for recording the digital information encrypted by the third encrypting function on a recording medium.

10. A copyright protection apparatus according to claim 9, wherein said third encrypting function is specific to the recording medium.

11. A copyright protection method, comprising:

receiving digital information of a work encrypted by a first encrypting function specific to the digital information, encrypting the digital information with a second encrypting function, said second encrypting function being specific to a medium recording the digital information, transmitting decrypting information for decrypting the digital information encrypted by the second encrypting function to a copyright managing server for managing a copyright of the digital information, and transmitting from the copyright managing server a decrypting function for decrypting the digital information encrypted by the first encrypting function and the second encrypting function according to the decrypting information, wherein said first encrypting function and said second encrypting function use a same function system, said function system having a solution that is a remainder obtained by multiplying the digital information by a matrix to obtain, a product and dividing each element of the product by a predetermined prime number.

* * * * *